United States Patent
Nilsson et al.

[11] Patent Number: 5,347,812
[45] Date of Patent: Sep. 20, 1994

[54] PLUNGE VALVE

[75] Inventors: Dan Nilsson, Sjuntorp; Ove Donnerdal, Partille, both of Sweden

[73] Assignee: Aktiebolaget Electrolux, Stockholm, Sweden

[21] Appl. No.: 105,031

[22] Filed: Aug. 11, 1993

[30] Foreign Application Priority Data

Aug. 21, 1992 [SE] Sweden .................. 9202400-9

[51] Int. Cl.⁵ .................. F16D 31/04; F16K 15/02
[52] U.S. Cl. .................. 60/494; 60/456; 137/514.5; 137/538
[58] Field of Search ........... 137/538, 514.5; 60/456, 60/494; 91/468

[56] References Cited

U.S. PATENT DOCUMENTS

| | | | |
|---|---|---|---|
| 2,102,865 | 12/1937 | Vickers | 60/494 X |
| 2,225,880 | 12/1940 | Montelius | 137/538 X |
| 2,243,711 | 5/1941 | Lamb | 137/538 X |
| 2,930,572 | 3/1960 | Aursen | 137/538 X |
| 3,043,107 | 7/1962 | Magnus, Jr. | 60/494 X |
| 3,074,428 | 1/1963 | Mancewicz | 137/538 X |
| 3,375,853 | 4/1968 | Meshulam | 137/538 X |
| 3,704,588 | 12/1972 | Trabbic | 60/494 X |
| 3,890,788 | 6/1975 | Habiger | 60/494 X |
| 4,694,649 | 9/1987 | Howeth | 60/494 X |
| 5,180,443 | 1/1993 | Voss | 137/538 X |

FOREIGN PATENT DOCUMENTS

| | | |
|---|---|---|
| 1964338 | 7/1971 | Fed. Rep. of Germany. |
| 2202547 | 8/1973 | Fed. Rep. of Germany ...... 137/538 |

*Primary Examiner*—John Rivell
*Attorney, Agent, or Firm*—Frost & Jacobs

[57] ABSTRACT

A plunge valve for closing and for opening a connection in a hydraulic conduit comprises a plunge (37) which is slidably movable in the hydraulic conduit (5, 5A) under the influence of the pressure in a section (5A) of the conduit on the inlet side of said conduit adjacent to the plunge between a first, open position, when the pressure in said section (5A) is high, in which position the plunge is withdrawn and communication is established, and a second, closed position, in which the pressure in said section is low, in which position the plunge shuts off said connection.

15 Claims, 1 Drawing Sheet

PLUNGE VALVE

TECHNICAL FIELD

The invention relates to a plunge valve for closing and for opening a connection in a hydraulic conduit. The plunge valve has been designed in the first place to be included as an integrated member in a hydraulic motor comprising a motor chamber having driving means provided to drive an axle under the influence of a hydraulic medium, an inlet hydraulic conduit to the inlet side of the motor chamber, and an outlet hydraulic conduit from the outlet side of the motor chamber. The use of the plunge valve, however, is not limited to this application but can be used also in other hydraulic apparatuses and particularly where there is a need for the ability to completely shut off an idling flow.

BACKGROUND OF THE INVENTION

It is known in the art to operate hydraulic motors of the type mentioned in the preamle by opening a by-pass conduit between the inlet side and the outlet side of the motor chamber, so that the inlet side of the motor chamber will be pressure unloaded. It is for example known to use this principle in connection with hydraulically driven circular saw discs, cutter discs, and the like. It is an advantage of this technique that a main valve in the by-pass conduit advantageously can be operated by means of a pilot valve, which needs only a very small actuation power at the same time as the design can be made compact and light, which makes it suitable for use in portable machines. It is, however, a drawback that the operation of the motor by means of a valve in a by-pass conduit does not in fact shut off the conduits to and from the motor chamber but only lead the main flow of hydraulic liquid another way, which means that an idling flow of hydraulic liquid may pass through the motor chamber. This in turn means that it is not ensured that the tool which is powered by the motor, for example a circular sawing disc, a cutter disc, or the like, can be completely stopped by opening the by-pass conduit but continue to rotate. It is true that it will rotate at a smaller force and with a low rate, but however rotate, because of a certain idling flow.

BRIEF DESCRIPTION OF THE INVENTION

It is an object of the invention to provide a plunge valve by means of which a connection in a hydraulic conduit can be completely shut off. The invention is particularly intended to eliminate the idling flow to the motor chamber in a hydraulic motor of the type which is operated by means of one or more valves in a conduit which is by-pass coupled in parallel with the motor chamber.

It is also an object to provide a plunge valve which has a design, which makes it possible to integrate it in a hydraulic motor as well as applying it as a separate unit to a hydraulic motor or other hydraulic apparatuses.

Further, it is an object to provide a plunge valve which is comparatively easy to manufacture and which requires only little or no maintenance.

These and other objects may be achieved therein that the invention is characterized in what is stated in the appending claims.

Further characteristic features and aspects of as well as advantages of the invention will be apparent from the following description of a preferred embodiment.

BRIEF DESCRIPTION OF DRAWINGS

A preferred embodiment of the invention will be described in the following with reference to the accompanying drawings, in which.

DESCRIPTION OF A PREFERRED EMBODIMENT

Figure 1:
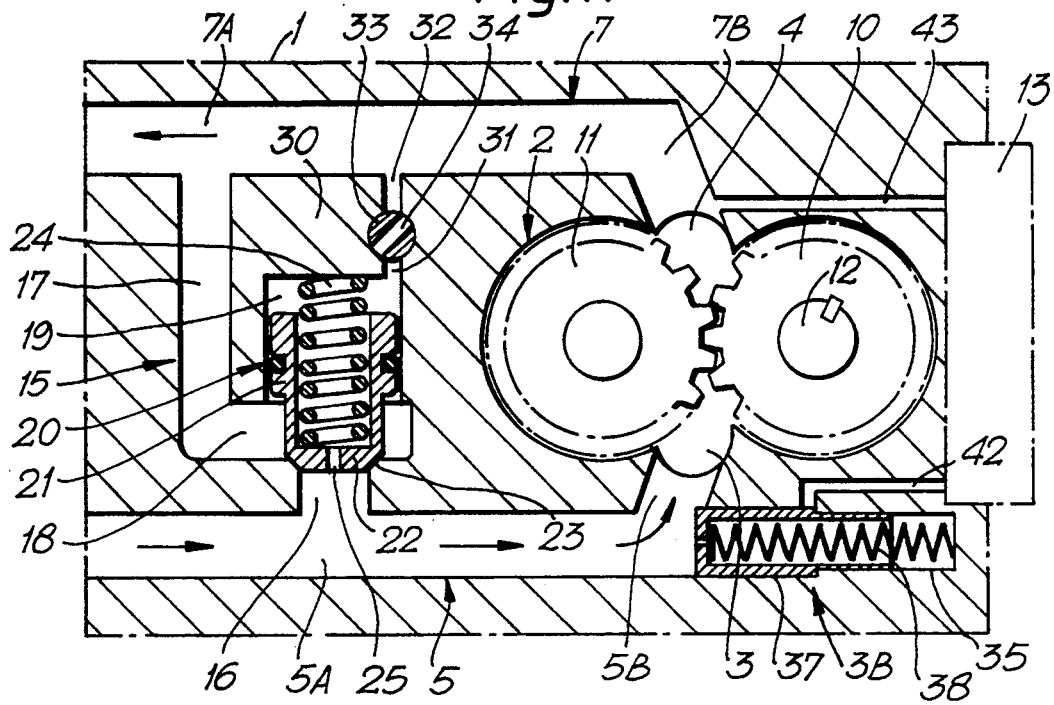
FIG. 1 is a section through a schematically shown hydraulic motor, in which the pilot valve is included as an integrated part. The drawing shows the motor in operation.
Figure 2:
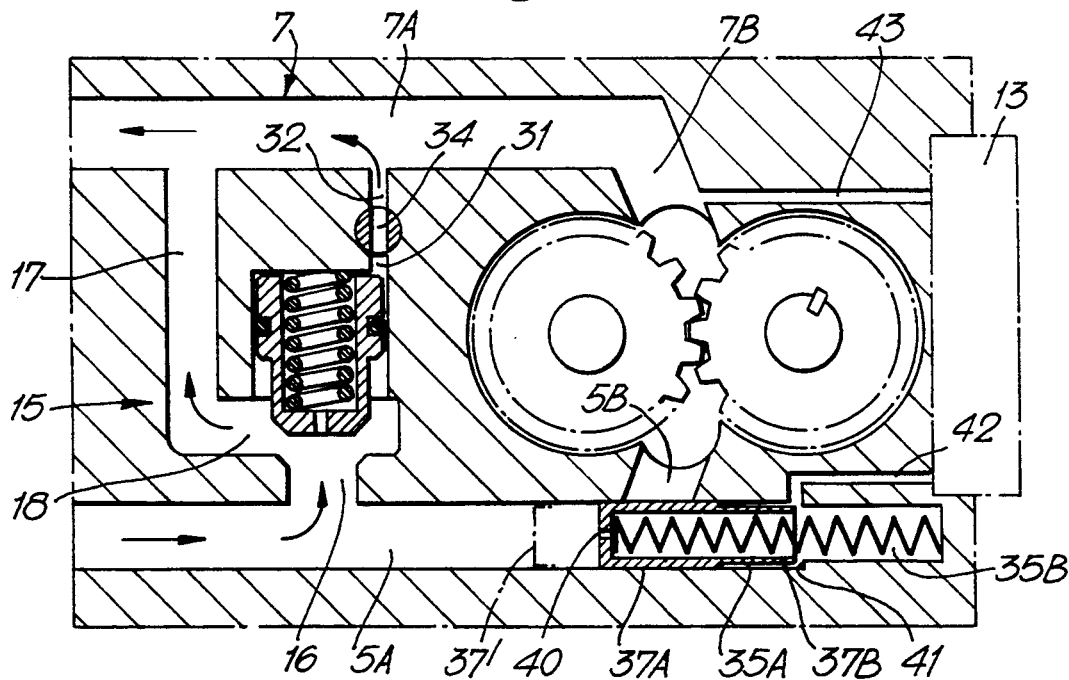
FIG. 2 shows the same motor during standstill, wherein the pilot valve according to the invention prevents any idling flow through the motor chamber.

In FIG. 1 and FIG. 2 a symbolically shown motor body is designated 1. In the motor body there is a motor chamber generally designated 2. An inlet chamber and an outlet chamber in direct connection to the motor chamber 2 are designated 3 and 4, respectively. An inlet conduit to the inlet chamber 3, generally designated 5, consists of a first section 5A and a second section 5B at an angle to the first section. Corresponding sections of an outlet conduit 7 from the outlet chamber 4 are designated 7A and 7B, respectively.

In the motor chamber 2 there are a pair of cog wheels 10, 11, which in a manner known per se are driven by the hydraulic oil which may enter the inlet chamber 3 via the inlet conduit 5. One of the cog wheels, cog wheel 10, has an output shaft or axle 12. A bearing housing for the axle 12 is symbolically designated 13.

Between the inlet conduit 5 and the outlet conduit 7, more particularly between the sections 5A and 7A in said conduits, there are, according to the chosen application of the invention, a by-pass conduit which is generally designated 15. This conduit consists of a first by-pass portion 16 in communication with the first section 5A of inlet conduit 5 and a second by-pass portion 17 in communication with the first section 7A of outlet conduit 7, and between said first and second by-pass portions a cross link 18.

In the axial elongation of the first by-pass portion 16 there is a cylindrical valve chamber 19 accomodating a main valve generally designated 20. The main part of the main valve consists of a valve body, the rear part of which is designed as a piston 21, which has a larger cross area than the front part of the valve body, which is designed to define a plug 22. The valve body can be displaced in the valve chamber 19. The plug 22 in the sealing position of valve 20 contacts a valve seat 23 in said first by-pass portion 16. A return spring is designated 24. A small through-boring 25 is provided in the plug 22.

A pilot valve 30 (an operator valve which can be operated by an operator by operating means (not shown) is provided in a conduit between valve chamber 19 and outlet conduit 7, more particularly between a connection 31 extending from valve chamber 19 and a connection 32 to outlet conduit 7. The pilot valve 30 can for example be of turning slide type. The turning slide is designated 33 and a passage through the turning slide 33 is designated 34. The passage 34 and the connections 31 and 32 have a larger cross section than the opening 25 in the valve plug 22.

In the axial projection of the first section 5A of inlet conduit 5 there is provided a differential pressure type plunge valve 3B in a plunge chamber consisting of a boring in the motor body. In the plunge chamber 35 there is provided a plunge consisting of a sleeve. The plunge can be displaced inwardly in plunge chamber 35 to the position, shown in FIG. 1 under the influence of the hydraulic pressure in inlet conduit 5 compressing a return spring 38.

The plunge chamber 35 consists of two sections, namely a first front section 35A adjacent to the second section 5B of inlet conduit 5, said first plunge chamber section 35A having a diameter and a cross section area equal to that of the first section 5A of the inlet conduit, and a second rear section 35B having a smaller diameter and a smaller cross section area.

Also the sleeve shaped plunge 37 has two sections having different diameters and cross section areas. A first front plunge section 37A has the same diameter and cross section area and also the same length as the first plunge chamber section 35A. A second rear plunge section 37B has the same diameter and cross section area as the rear plunge chamber section 35B but is preferably somewhat shorter than that one. At least it is not longer. The boring/plunge chamber 35 constitutes the cylinder of plunge 37. In this cylinder there is provided an annular edge 41 in the bottom of the first front plunge chamber section 37A. A first drainage conduit 42 leads from an opening adjacent to said edge 41 to the bearing housing 13, and from the bearing housing 13 a second drainage conduit 43 leads to the outlet conduit 7. In the front end of the plunge 37 there is also a passage in the form of a small hole 40.

How the above described hydraulic pump and the plunge valve 36 of the present invention work will now be described more closely. It should, however, be noted that the application of the plunge valve in this hydraulic pump only is one example of how the plunge valve can be used in order to completely open and to shut off a connection in a conduit, in dependency of the hydraulic pressure in said conduit.

Reference is first made to FIG. 1, which shows the conditions during operation of the hydraulic motor. The pilot valve 30 then is closed and the main valve plug 22 abuts the seat 23.

Through the opening 25 in the valve plug 22 the main valve chamber 19 communicates with the inlet conduit 5. The pressure on both sides of the main valve 20 at this moment is equal. Because on one hand of the larger cross section area of the rear part of the valve body, and on the other hand of the spring 24, the valve plug 22 is pressed against the valve seat 23. Herethrough the cross link 18 is disconnected, so that the by-pass conduit 15 is completely closed. At this moment there is full pressure along the whole length of the inlet conduit 5, i.e. also in the sections 5A and 5B, which keeps the plunge 37 in the plunge valve 3B pressed into the plunge chamber 35, so that the hydraulic medium can freely pass from section 5A to section 5B and into the inlet chamber 3. The hydraulic medium drives the cog wheels 10, 11 under pressure by passing in a manner known per se between the cog wheels to the outlet chamber 4 and therefrom via the two portions 7B and 7A of the outlet conduit 7 to a return hydraulic hose or the like (not shown).

During operation, still with reference to FIG. 1, the rear edge of the foremost plunge section 37A abuts the annular edge 41. In this position the plunge 37 effectively closes the evacuation conduit 42. The plunge chamber 35, however, communicates through the hole 40 with the inlet conduit 5, so that there will be equal pressure on the front and rear sides of the plunge during operation, FIG. 1. It should also be observed that the plunge 37 has the same inner diameter along its entire length corresponding to the inner diameter of the rear part 37A of the plunge. Further, the outer diameter of the plunge in the region of the front part 37A is substantially larger than its inner diameter. Under the prevailing equilibrium pressure the hydraulic power which acts on the front side of the plunge will, because of the said area difference, be substantially larger than the power which acts on the rear side. The power difference is substantially larger than the power of the spring 38, so that the plunge 37 during operation will be safely pressed into the bottom position which is defined by the annular edge 41 against which the foremost plunge portion 37A abuts with its rear edge. Herein it is made sure that the passage between the two sections 5A and 5B of the inlet conduit is completely free and also that no leakage can take place through the evacuation conduit 42, which during this phase is completely closed by the plunge.

When the motor shall be stopped, the pilot valve 30 is opened. The hydraulic medium on the rear side of the main valve 20 then can be evacuated via conduit 31–32 and channel 34 to outlet conduit 7. All these passages 31, 34, and 32 have a larger cross section than the hole 25 in the valve plug 22. The pressure in the valve chamber 19 drops and the valve piston 21 is displaced upwards in the valve chamber 19 under the influence of the hydraulic pressure which acts on the valve plug 22, so that the cross link 18 is freed, wherein the by-pass conduit 15 is opened, FIG. 2. The hydraulic medium now will flow freely through the by-pass conduit 15 to the outlet conduit 7. Herein the pressure in the inlet conduit 5 will drop, which has an influence upon the plunge valve 3B. Thus, as the pressure in both the portions 5A and 5B of the inlet conduit 5 drops, the pressure in the plunge chamber 35 will exceed that in the portions 5A, 5B of the inlet conduit. The pressure difference and the return spring 38 drive the plunge out of the plunge chamber 35 so far that the plunge passes beyond the edge 41, so that the evacuation conduit 42 is opened, and so that the front section 37A of the plunge will extend into the first section 5A of the inlet conduit, FIG. 2, at least so far that the passage between the sections 5A and 5B will be completely closed. The hydraulic pressure in the plunge chamber 35 drops by the fact that the plunge chamber communicates with the evacuation conduit 42. Therefore, there will act upon the plunge 37 a resulting hydraulic power which tends to move the plunge 37 into the plunge chamber 35, but this power is compensated by the return spring 38, which is dimensioned for this purpose, so that the plunge during stoppage of operation, when hydraulic medium flows through the by-pass conduit 15, is maintained in the position shown in FIG. 2. Because of the pressure difference on the front and rear side of the plunge, which is small per se, a negligible flow of hydraulic medium will flow through the opening 40 during operation and be evacuated through the evacuation conduit 42, the bearing housing 13, and the conduit 43 to the return conduit 7.

Possibly the plunge i n the closing position may be moved more forwards in the first portion 5A of the inlet conduit. The plunge is designated 37' in this foremost position, which is indicated by ghost lines. It is true that the first section 5A in this case communicates with the second section 5B through the hole 40, but the flow is negligible and is moreover evacuated through the evacuation conduit 42. By the fact that the plunge 37 can have a closing action over a comparatively large range, the plunge valve will function in the intended manner within a range which is variable to a corresponding degree as far as the hydraulic pressure in the inlet conduit 5 is concerned and allows moreover large tolerances concerning the characteristics of the plunge spring 38.

When the motor shall be started, the operator closes the pilot valve 30 by actuation means (not shown). The hydraulic pressure in the main valve chamber 19 is increased and is equalled through the communication between the inlet portion 16 of the by-pass conduit and the valve chamber 19 very quickly to equilibrium between the portion 16 and the valve chamber 19. The pressure in the cross link 18, however, is somewhat lower than in the first by-pass portion 16. The hydraulic power, which acts upon the rear side of the valve body, therefore will be somewhat larger than that one which acts on the front side which drives the valve plug downwards against the valve seat. Moreover, the return spring 24 coacts in this closing movement which brings the valve plug 22 to sealing abutment against the seat 23.

When the main valve 22 has been closed, the pressure in the first section 5A of the inlet conduit is increased almost instantaneously to full pressure, which with full power acts upon the plunge 37. The plunge chamber 35 at this moment is filled with hydraulic medium, which is evacuated according to the following. During a first moment, until the rear edge of the rear section 37B of the plunge has passed the annular edge 41, the hydraulic chamber 35 communicates with the evacuation conduit 42, so that hydraulic medium from the hydraulic chamber 35 freely can be evacuated through conduit 42. During the subsequent moment of the movement of the plunge, hydraulic medium existing inside the plunge 37 is pressed out through the opening 40, while the hydraulic medium which exists in the annular gap between the rear portion 37B of the plunge and the plunge chamber wall in its outer broader portion 35B is pressed out through the evacuation conduit 42, so that the plunge can reach its bottom position. In this position the rear edge of the foremost, broader plunge portion 37A is pressed against the annular edge 41, which defines the bottom of the foremost plunge chamber portion 35A. Therein the completely open position with free passage between the two portions 5A and 5B of the inlet conduit has been reachieved, which position was described at the beginning.

I claim:

1. A hydraulic motor assembly of the type which includes an inlet port, an outlet port, and a source of pressurized hydraulic medium, said hydraulic motor comprising: a motor body containing a motor chamber; an inlet chamber and an outlet chamber connected to the motor chamber; an inlet conduit interruptably hydraulically connected to the inlet chamber of the motor chamber and an outlet conduit hydraulically connected to the outlet chamber; a bypass conduit interruptably hydraulically connected between said inlet conduit and said outlet conduit having a main valve therewithin; said main valve including a valve body which is movable from a closed position, thereby interrupting said bypass conduit and causing hydraulic medium to flow through said inlet conduit, inlet chamber, and motor chamber and driving a hydraulic motor positioned within said motor chamber, to an open position thereby opening said bypass conduit and causing hydraulic medium to flow through said bypass conduit; a plunge valve comprising a plunge which is slidably movable within a plunge chamber under the influence of the hydraulic pressure in a section of said inlet conduit located between said bypass conduit and said inlet chamber, said plunge being shiftable between first and second positions, said first position occurring when the valve body of said main valve is in its closed position thereby interrupting said bypass conduit and allowing the pressure in said section of the inlet conduit to increase to a high magnitude which then prevents said plunge from entering into the inlet conduit by forcing said plunge to remain in the plunge chamber; said second position occurring when the valve body of the main valve is in its open position thereby opening said bypass conduit and causing the pressure in said section of the inlet conduit to decrease to a low magnitude which then allows said plunge to enter into the inlet conduit thereby interrupting the flow of hydraulic medium into said inlet chamber; and a resilient biasing member which assists in displacing said plunge from said first position within said plunge chamber to said second position.

2. The hydraulic motor assembly as recited in claim 1, wherein the section of said inlet conduit between the bypass conduit and the inlet chamber comprises a connection in a hydraulic conduit within said hydraulic motor assembly which is alternately opened and closed by the slidable movement of said plunge, said first position being a first, open position, when the pressure in said section is high, in which position the plunge is withdrawn and a communication is established, said second position being a second, closed position, when the pressure in said section is low, wherein the plunge shuts off said connection.

3. A plunge valve according to claim 2, wherein said connection comprises a connection between said first section of the hydraulic conduit and a second section of said conduit, said second section forming an angle to the first section.

4. A plunge valve according to claim 3, wherein a plunge chamber is provided in the axial projection of the first section of the hydraulic conduit, the plunge being accommodated in said plunge chamber in the first, open position of the valve.

5. A plunge valve according to claim 2, wherein an evacuation conduit extends from the plunge chamber for the evacuation of hydraulic medium from the plunge chamber during at least one moment of the movement of the plunge, when the plunge is moving from the second, closed position to the first, open position.

6. A plunge valve according to claim 5, wherein the plunge chamber has at least two cylindrical sections having different dimensions, namely a first, foremost, broader section and a second, rear, narrower section, and wherein an annular bottom edge is provided in the bottom of said foremost section, said plunge having front and rear sections having the same diameters as corresponding sections of the plunge chamber.

7. A plunge valve according to claim 6, wherein the front section of the plunge is essentially as long as the front section of the plunge chamber, the rear section of the plunge is shorter than or at least not longer than the rear section of the plunge chamber, and the outlet opening for the evacuation conduit for hydraulic liquid is located adjacent to said bottom edge.

8. A plunge valve according to claim 2, wherein a small aperture is provided in that portion of the plunge which faces the inlet conduit, through which aperture hydraulic liquid can be pressed out from the plunge chamber, when the plunge is pressed into said chamber and vice versa.

9. A plunge valve according to claim 3, wherein an evacuation conduit extends from the plunge chamber for the evacuation of hydraulic medium from the plunge chamber during at least one moment of the movement of the plunge, when the plunge is moving from the second, closed position to the first, open position.

10. A plunge valve according to claim 4, wherein an evacuation conduit extends from the plunge chamber for the evacuation of hydraulic medium from the plunge chamber during at least one moment of the movement of the plunge, when the plunge is moving from the second, closed position to the first, open position.

11. A plunge valve according to claim 3, wherein a small aperture is provided in that portion of the plunge which faces the inlet conduit, through which aperture hydraulic liquid can be pressed out from the plunge chamber, when the plunge is pressed into said chamber and vice versa.

12. A plunge valve according to claim 4, wherein a small aperture is provided in that portion of the plunge which faces the inlet conduit, through which aperture hydraulic liquid can be pressed out from the plunge chamber, when the plunge is pressed into said chamber and vice versa.

13. A plunge valve according to claim 5, wherein a small aperture is provided in that portion of the plunge which faces the inlet conduit, through which aperture hydraulic liquid can be pressed out from the plunge chamber, when the plunge is pressed into said chamber and vice versa.

14. A plunge valve according to claim 6, wherein a small aperture is provided in that portion of the plunge which faces the inlet conduit, through which aperture hydraulic liquid can be pressed out from the plunge chamber, when the plunge is pressed into said chamber and vice versa.

15. A plunge valve according to claim 7, wherein a small aperture is provided in that portion of the plunge which faces the inlet conduit, through which aperture hydraulic liquid can be pressed out from the plunge chamber, when the plunge is pressed into said chamber and vice versa.

* * * * *